(12) United States Patent
Shudo

(10) Patent No.: US 10,199,840 B2
(45) Date of Patent: Feb. 5, 2019

(54) CHARGING UNIT AND CHARGING SYSTEM FOR SELF-PROPELLED ELECTRIC VACUUM CLEANER

(71) Applicant: Sharp Kabushiki Kaisha, Osaka-shi, Osaka (JP)

(72) Inventor: Takumi Shudo, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 298 days.

(21) Appl. No.: 14/915,700

(22) PCT Filed: Aug. 25, 2014

(86) PCT No.: PCT/JP2014/072181
§ 371 (c)(1),
(2) Date: Mar. 1, 2016

(87) PCT Pub. No.: WO2015/122040
PCT Pub. Date: Aug. 20, 2015

(65) Prior Publication Data
US 2016/0352112 A1 Dec. 1, 2016

(30) Foreign Application Priority Data

Feb. 17, 2014 (JP) ................................. 2014-027569

(51) Int. Cl.
*H02J 7/00* (2006.01)
*A47L 9/28* (2006.01)
(Continued)

(52) U.S. Cl.
CPC .............. *H02J 7/0027* (2013.01); *A47L 9/28* (2013.01); *A47L 11/4011* (2013.01);
(Continued)

(58) Field of Classification Search
CPC ....... H02J 7/0027; H02J 7/00; A47L 11/4041; A47L 11/4013; A47L 11/4011;
(Continued)

(56) References Cited

U.S. PATENT DOCUMENTS

2004/0178767 A1* 9/2004 Jeon ........................ A47L 9/009
320/114
2005/0156562 A1* 7/2005 Cohen .................... A47L 9/2857
320/107
(Continued)

FOREIGN PATENT DOCUMENTS

CN 101648377 A 2/2010
JP 2004-136144 A 5/2004
(Continued)

OTHER PUBLICATIONS

Official Communication issued in International Patent Application No. PCT/JP20141072181, dated Nov. 18, 2014.

*Primary Examiner* — Jason Holloway
(74) *Attorney, Agent, or Firm* — Keating & Bennett, LLP

(57) ABSTRACT

A charging unit for charging a battery of a self-propelled electric vacuum cleaner which runs on a floor based on outputs of an infrared beam reflection-type floor detection sensor and an infrared beam detection sensor, includes an infrared beam-transmitting unit for emitting an infrared beam for indicating a return path and an infrared beam-absorbing part, in which the infrared beam-transmitting unit and the infrared beam-absorbing part are provided such that the infrared beam detected by the infrared beam detection sensor and the infrared beam absorbing part detected by the floor detection sensor allow the vacuum cleaner to return to the charging unit.

5 Claims, 18 Drawing Sheets

(51) Int. Cl.
*G05D 1/02* (2006.01)
*A47L 11/40* (2006.01)
*H02J 7/02* (2016.01)

(52) U.S. Cl.
CPC ....... *A47L 11/4013* (2013.01); *A47L 11/4041* (2013.01); *G05D 1/0225* (2013.01); *G05D 1/0242* (2013.01); *G05D 1/0244* (2013.01); *H02J 7/0042* (2013.01); *H02J 7/02* (2013.01); *A47L 2201/022* (2013.01); *A47L 2201/04* (2013.01); *G05D 2201/0215* (2013.01)

(58) Field of Classification Search
CPC .. A47L 9/28; A47L 2201/04; A47L 2201/022; G05D 1/0244; G05D 1/0225; G05D 1/0242; G05D 2201/0215
See application file for complete search history.

(56) References Cited

U.S. PATENT DOCUMENTS

| | | | |
|---|---|---|---|
| 2007/0233319 A1* | 10/2007 | Im | G05D 1/0225 700/245 |
| 2008/0161969 A1* | 7/2008 | Lee | G05D 1/0225 700/245 |
| 2011/0130874 A1* | 6/2011 | Tsao | G05D 1/0225 700/245 |
| 2015/0151646 A1* | 6/2015 | Noiri | G05D 1/0225 701/22 |

FOREIGN PATENT DOCUMENTS

| | | |
|---|---|---|
| JP | 2009-038880 A | 2/2009 |
| JP | 2009-238055 A | 10/2009 |
| JP | 2013-146302 A | 8/2013 |
| WO | 02/062194 A1 | 8/2002 |

* cited by examiner

US 10,199,840 B2

CHARGING UNIT AND CHARGING SYSTEM FOR SELF-PROPELLED ELECTRIC VACUUM CLEANER

TECHNICAL FIELD

The present invention relates to a charging unit (charging station) and a charging system for a self-propelled electric vacuum cleaner.

BACKGROUND ART

As a background technique of the present invention, a self-propelled electric vacuum cleaner which returns to a charging station while an infrared beam detection sensor detects infrared beams transmitted from the charging station is known (see, for example, Patent Document 1).

PRIOR ART DOCUMENT

Patent Document

Patent Document 1: Japanese Patent Laid-open Publication No. 2013-146302

SUMMARY OF THE INVENTION

Problems to be Solved by the Invention

However, such a conventional self-propelled electric vacuum cleaner has low detection precision since only an infrared beam detection sensor detects a return path to a charging station and takes time to return to a desired position of the charging station and therefore it has been desired that the conventional self-propelled electric vacuum cleaner is improved.

The present invention has been made in light of such a situation, and provides a charging unit and a charging system which can efficiently cause a vacuum cleaner to return by focusing on and using floor detection sensors included in a self-propelled electric vacuum cleaner.

Solutions to the Problems

The present invention is a charging unit for a self-propelled electric vacuum cleaner which charges a battery of a self-propelled electric vacuum cleaner which runs on a floor based on outputs of an infrared beam reflection-type floor detection sensor and an infrared beam detection sensor, which includes: an infrared beam-transmitting unit which emits an infrared beam for indicating a return path; and an infrared beam-absorbing part, and in which the infrared beam-transmitting unit and the infrared beam-absorbing part are disposed such that, when the infrared beam detection sensor detects the infrared beam and the floor detection sensor detects the infrared beam-absorbing part, the self-propelled electric vacuum cleaner can return to the charging unit.

Effects of the Invention

According to the present invention, a charging unit includes an infrared beam-transmitting unit which emits infrared beams for indicating a return path, and an infrared beam-absorbing part, so that a self-propelled electric vacuum cleaner can precisely and efficiently return to the charging unit while a detection sensor detects infrared beams and a floor detection sensor detects the infrared beam-absorbing part.

EMBODIMENTS OF THE INVENTION

Figure 1:
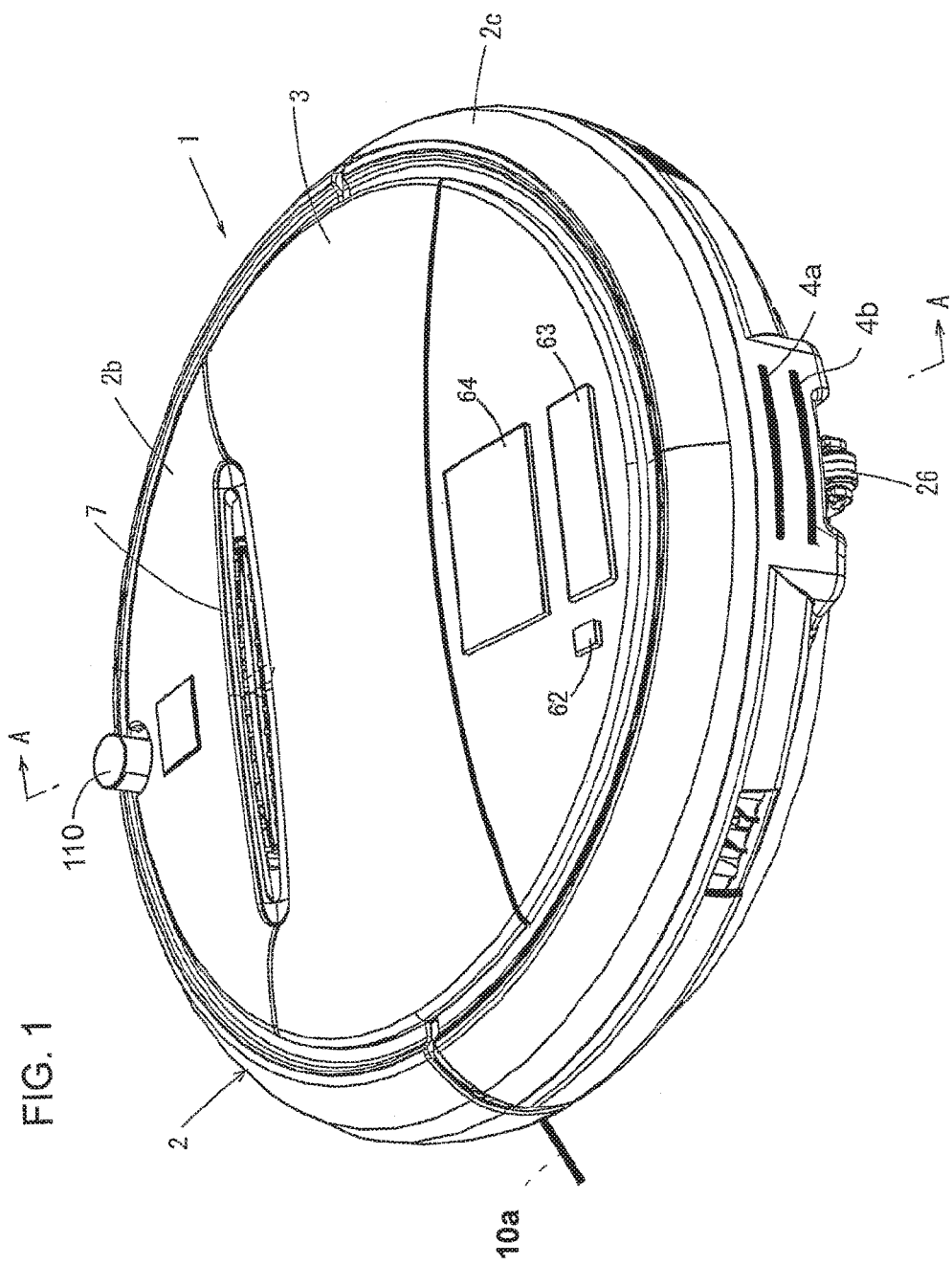
FIG. 1 is a perspective view showing a rear side of a top surface of a self-propelled electric vacuum cleaner according to Embodiment 1 of the present invention.

A charging unit for a self-propelled electric vacuum cleaner according to the present invention is a unit which charges a battery of a self-propelled electric vacuum cleaner which runs on a floor based on outputs of an infrared beam reflection-type floor detection sensor and an infrared beam detection sensor, which includes: an infrared beam-transmitting unit which emits an infrared beam for indicating a return path; and an infrared beam-absorbing part, and in which the infrared beam-transmitting unit and the infrared beam-absorbing part are installed such that, when the infrared beam detection sensor detects the infrared beam and the floor detection sensor detects the infrared beam-absorbing part, the vacuum cleaner can return to the charging unit.

In this regard, the infrared beam reflection-type floor detection sensor detects whether or not there is a floor (step) by, for example, combining an infrared light emitting element (LED) and a light receiving element (phototransistor), irradiating the floor with infrared beams and receiving reflected light beams.

Further, the infrared beam-absorbing part includes a function of absorbing infrared beams from the floor detection sensor, and an infrared beam-absorbing member of a sheet shape such as a commercial graphite sheet is suitably used for the infrared beam-absorbing part such that the infrared beam-absorbing part can be installed along the floor.

According to the present invention, the infrared beam-absorbing part may include a plurality of infrared beam-absorbing members disposed near the return path and along the floor.

The infrared beam-absorbing member may include two infrared beam-absorbing members of two band shapes disposed in parallel to the return path and along the floor.

The infrared beam-absorbing part may include an infrared beam-absorbing member of a band shape disposed orthogonal to the return path and along the floor. The infrared beam-absorbing member of the band shape may include a plurality of infrared beam-absorbing members of band shapes disposed at intervals and in parallel.

From another point of view, the present invention provides a charging system for the self-propelled electric vacuum cleaner in which the infrared beam reflection-type floor detection sensor is provided to the self-propelled electric vacuum cleaner and the infrared beam-absorbing part is provided to the charging unit, and the self-propelled electric vacuum cleaner is charged by returning to the charging unit while the floor detection sensor detects the infrared beam-absorbing part.

The present invention will be described in detail below by using the embodiment shown in the drawings. This description by no means limits the present invention.

Embodiment 1

(1) Configuration of Self-Propelled Electric Vacuum Cleaner

Figure 2:
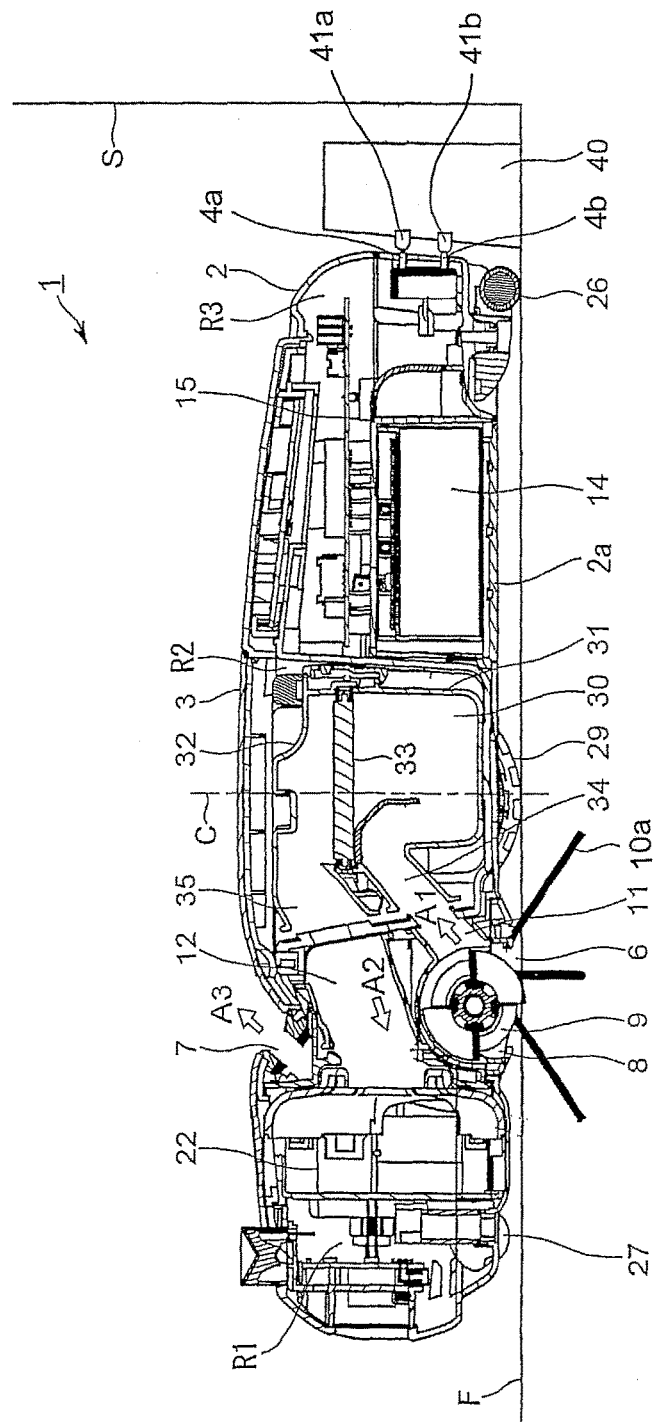
FIG. 2 is a sectional view taken from an arrow view A-A.
Figure 3:
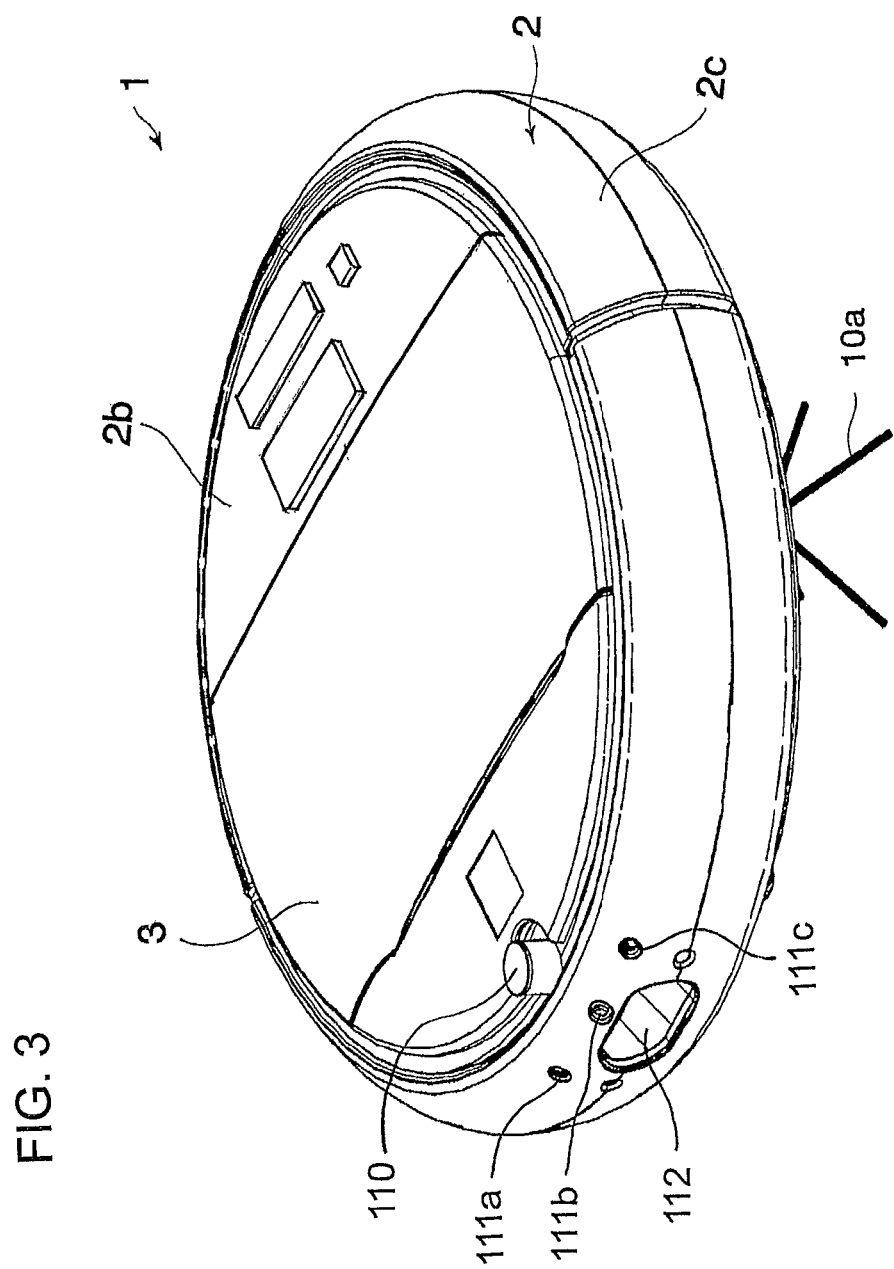
FIG. 3 is a perspective view showing a front side of the top surface of the self-propelled electric vacuum cleaner shown in FIG. 1.
Figure 4:
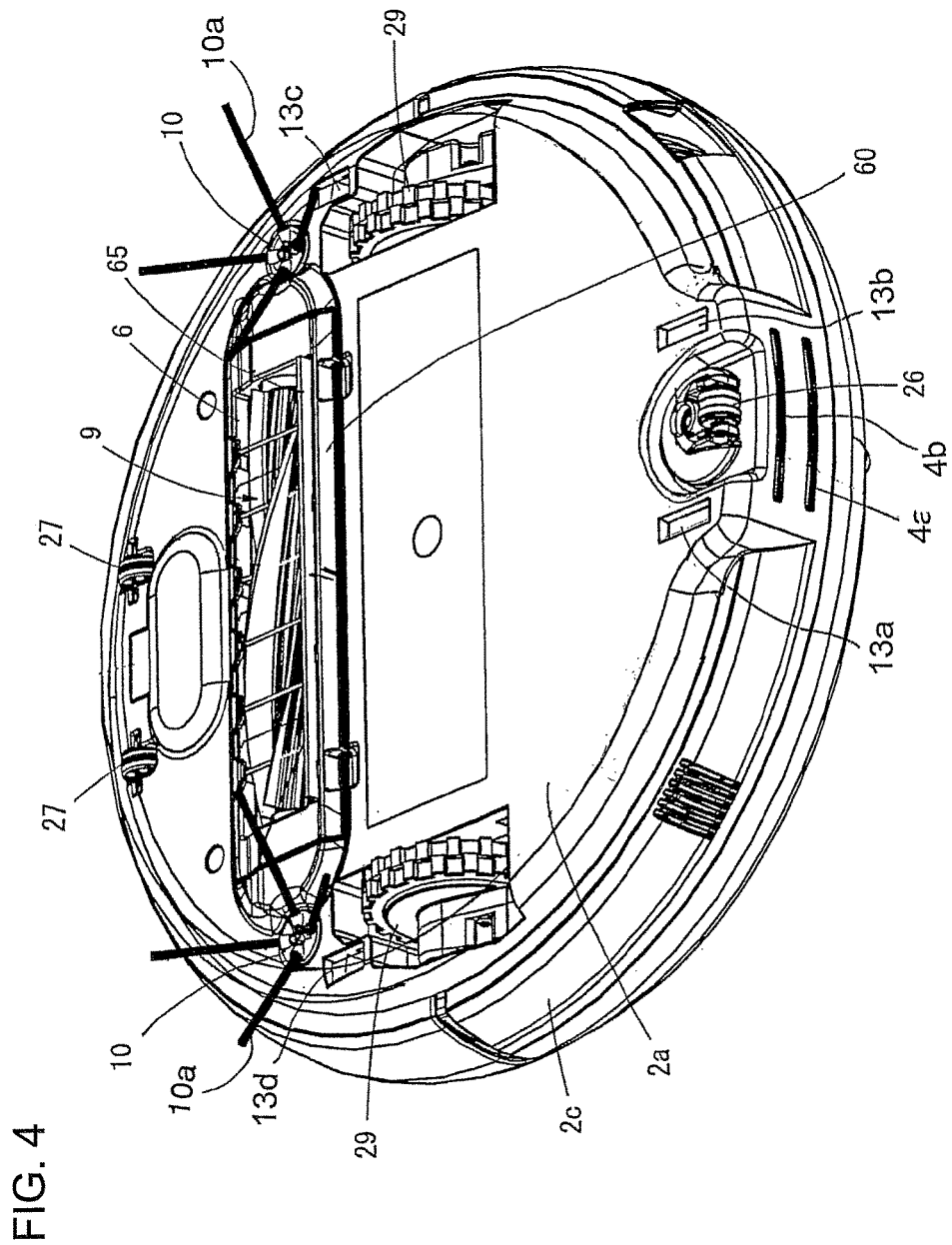
FIG. 4 is a perspective view showing a bottom surface side of the self-propelled electric vacuum cleaner shown in FIG. 1.
Figure 5:
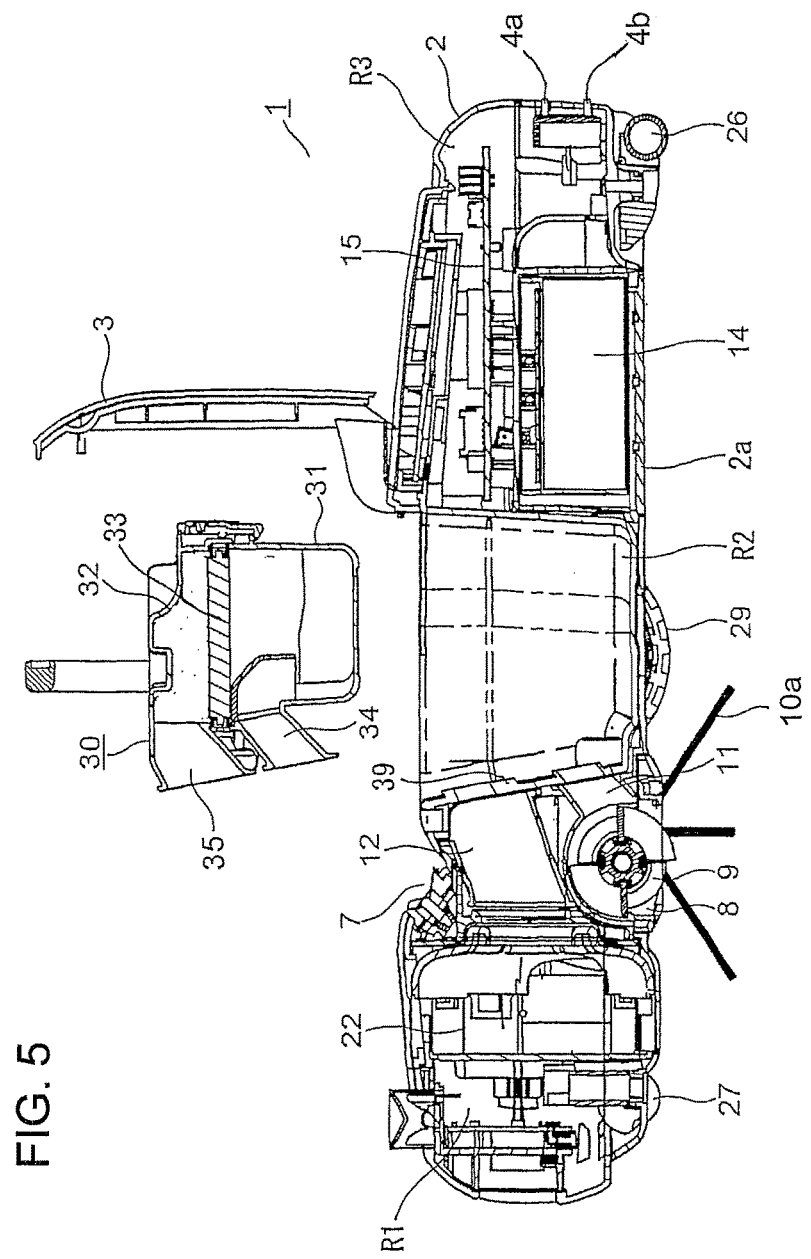
FIG. 5 is a view showing a state where a dust collector has been removed, and corresponding to FIG. 2.

FIG. 1 is a perspective view showing a rear side of a top surface of a self-propelled electric vacuum cleaner according to the present invention. FIG. 2 is a sectional view taken from an arrow view A-A. FIG. 3 is a perspective view showing a front side of the top surface of the self-propelled electric vacuum cleaner shown in FIG. 1. FIG. 4 is a perspective view showing a bottom surface side of the self-propelled electric vacuum cleaner shown in FIG. 1. FIG. 5 is a view showing a state where a dust collector has been removed, and corresponding to FIG. 2.

As shown in FIGS. 1 to 5, a self-propelled electric vacuum cleaner (referred to as a vacuum cleaner below) 1 according to Embodiment 1 is configured to clean a floor by running on a floor (cleaning target surface) F (FIG. 2) of a place at which the self-propelled electric vacuum cleaner 1 is disposed, suctioning air including dust on the floor F and exhausting air from whose dust has been removed.

The vacuum cleaner 1 includes a housing 2 of a disk shape, and, inside and outside of this housing 2, a rotary brush 9, a side brush 10, a dust box (referred to as a dust collector) 30, an electric blower 22, a pair of driving wheels 29, a rear wheel 26 and a front wheel 27 are provided.

In this cleaner 1, a portion at which the front wheel 27 is disposed is a front portion, a portion at which the rear wheel 26 is disposed is a rear portion, and a portion at which the dust collector 30 is disposed is an intermediate portion.

The housing 2 includes a bottom plate 2a (FIG. 4) which is circular when seen from a plan view and includes a suction port 6 formed at a portion near a boundary between the front portion and the intermediate portion, a top plate 2b (FIG. 1) which includes at the intermediate portion a cap 3 which is opened and closed to put and take the dust collector 30 in and out from the housing 2, and a side plate 2c which is provided along outer circumferences of the bottom plate 2a and the top plate 2b.

Further, a plurality of holes through which lower portions of the front wheel 27, a pair of driving wheels 29 and the rear wheel 26 protrude from an inside of the housing 2 is formed in the bottom plate 2a shown in FIG. 4, and an exhaust port 7 is formed at a boundary between the front portion and the intermediate portion of the top plate 2b shown in FIG. 1. In addition, the side plate 2c is divided into front and rear portions, and a front side portion is provided to be able to be displaced to function as a bumper.

Further, as shown in FIG. 1, the exhaust port 7 is formed in a front portion of the top plate 2b of the housing 2. At a rear portion of the top plate 2b of the housing 2, a power switch (push button switch) 62, an input section (input panel) 63 which includes an activation switch operated by a user, a switch described below for checking whether or not a collected dust amount is full and a switch for inputting other various conditions, and a display section (display panel) 64 which displays a warning for that a collected dust amount is full or displays a status of the vacuum cleaner are provided.

Further, as shown in FIG. 3, at a front end of the front portion of the top plate 2b of the housing 2, an infrared beam detection main sensor 110 is provided, and, at a front portion of the side plate 2c, three infrared beam detection sub sensors 111a to 111c and one ultrasonic distance measuring sensor 112 are provided.

The infrared beam detection main sensor 110 can detect infrared beams entering from all directions (360°), and the infrared beam detection sub sensors 111a to 111c can detect infrared beams entering at predetermined angles from a front. Further, the ultrasonic distance measuring sensor 112 emits an ultrasonic wave forward, and measures a distance based on a reflected ultrasonic wave.

Further, FIG. 5 is a view showing a state where the dust collector 30 has been removed and corresponding to FIG. 2. As shown in FIG. 5, inside the housing 2, a front storage room R1 which stores the electric blower 22 is provided at a front portion, and an intermediate storage room R2 which stores the dust collector 30 is provided at an intermediate portion.

Further, a rear storage room R3 which stores a control substrate 15 of a control section, a battery (storage battery) 14, and charging input terminals 4a and 4b is provided at a rear portion, and a suction path 11 and an exhaust path 12 are provided near a boundary between the front portion and the intermediate portion.

As shown in FIG. 5, the suction path 11 connects a suction port 6 (FIG. 4) and the intermediate storage room R2, and the exhaust path 12 connects the intermediate storage room R2 and the front storage room R1. In addition, each of the storage rooms R1, R2 and R2, the suction path 11 and the exhaust path 12 are provided inside the housing 2 and are partitioned by a partitioning wall 39 which forms spaces for these components.

A pair of driving wheels 29 are fixed to a pair of rotating shafts intersecting a center line C (FIG. 2) passing a center of the housing 2 at a right angle. When a pair of driving wheels 29 rotate in a same direction, the housing 2 moves forward and backward and, when each driving wheel 29 rotates in an opposite direction, the housing 2 turns about the center line C.

The rotating shafts of a pair of driving wheels 29 are coupled to individually obtain a rotation force from a pair of driving wheel motors, and each motor is fixed to the bottom plate 2a of the housing directly or via a suspension mechanism.

The front wheel 27 in FIG. 4 is a roller, and is rotatably provided to part of the bottom plate 2a of the housing 2 to come into contact with a step which shows up on a route, and to float a little from the floor F (FIG. 2) which the driving wheel 29 comes into contact with such that the housing 2 can easily get over the step.

The rear wheel 26 is a caster wheel, and is rotatably provided to part of the bottom plate 2a of the housing 2 such that the driving wheels 29 come into contact with the floor F.

Thus, a pair of driving wheels 29 are disposed at a middle of the housing 2 in forward and backward directions, and the front wheel 27 is floated from the floor F to allocate weights in the forward and backward directions for the housing 2 such that the weight of the self-propelled electric vacuum cleaner 1 can be supported by a pair of driving wheels 29 and the rear wheel 26. Consequently, it is possible to guide dust ahead of a route, to the suction port 6 without being blocked by the front wheel 27.

The suction port 6 in FIG. 4 is an open surface of a recess 8 (FIG. 2) formed in the bottom surface (bottom plate 2a) of the housing 2 to face the floor F, and the suction port 6 is formed by fitting a bottom plate as a suction body to the recess 8. In this recess 8, the rotary brush 9 (FIG. 4) which rotates about a shaft center parallel to the bottom surface of the housing 2 is provided, and, at both left and right sides of the recess 8, the side brush 10 which rotates about a rotating shaft center vertical to the bottom plate 2a is provided.

The rotary brush 9 is formed by spirally planting the brush in an outer circumference surface of a roller which is a rotating shaft. The side brush 10 is formed by radially providing four brush bundles 10a at a lower end of the rotating shaft.

In addition, the rotating shaft of the rotary brush 9 is coupled to a brush driving motor, and the rotating shaft of the side brush 10 is coupled to a side brush driving motor.

Further, as shown in FIG. 3, at a rear rim of the suction port 6, a napping brush 65 serving as a capturing member of a blade shape which captures dust which has not been suctioned by the suction port 6 and prevents the dust from scattering is provided.

The control substrate 15 (FIGS. 2 and 5) includes control circuits which compose a control system (FIG. 8) described below, i.e., the control circuits such as a microcomputer which controls the self-propelled electric vacuum cleaner 1 and a motor driver circuit which drives each element such as the driving wheels 29, the rotary brush 9, the side brush 10 and the electric blower 22.

At a rear end of the side plate 2c of the housing 2, the charging input terminals 4a and 4b which charge the battery 14 are provided as shown in FIG. 4. The self-propelled electric vacuum cleaner 1 which cleans a room while running in the room returns to a charging unit (charging station) 40 (FIG. 2) installed in the room. Thus, the charging input terminals 4a and 4b contact output terminals 41a and 41b provided to the charging unit 40, and charge the battery 14. The charging station 40 connected to a commercial power supply (outlet) is usually installed along a sidewall S in a room.

The dust collector 30 shown in FIG. 2 is generally stored in the intermediate storage room R2 above the shaft center of the rotating shaft of both of the driving wheels 29 in the housing 2, and dust collector 30 can be taken out or put in by opening the cap 3 of the housing 2 as shown in FIG. 4 to discard dust captured in the dust collector 30.

As shown in FIG. 4, the dust collector 30 includes a collected dust container 31 which has an opening, a filter 33 which covers the opening of the collected dust container 31 and a cover 32 which covers the filter 33 and the opening of the collected dust container 31. The cover 32 and the filter 33 are pivotally supported rotatably at an opening end rim at a front side of the collected dust container 31.

At a front of a sidewall of the collected dust container 31, an inflow path 34 which continues to the suction path 11 of the housing 2, and an exhaust path 35 which continues to the exhaust path 12 of the housing 2 in a state where the dust collector 30 is stored in the intermediate storage room R2 of the housing 2 are provided.

(2) Configuration of Floor Detection Sensor

As shown in FIG. 4, floor detection sensors 13a and 13b are disposed at both sides of the rear wheel 26, and floor detection sensors 13c and 13d are disposed at a front side of a pair of driving wheels 29. The vacuum cleaner 1 detects a large step (cliff) on a floor by using these sensors upon running and prevents the vacuum cleaner 1 from falling into the large step (cliff) and being unable to run, and detects the infrared beam-absorbing member by using these sensors and checks a returning route as described when returning to the charging unit 40 (FIG. 2).

Figure 6:
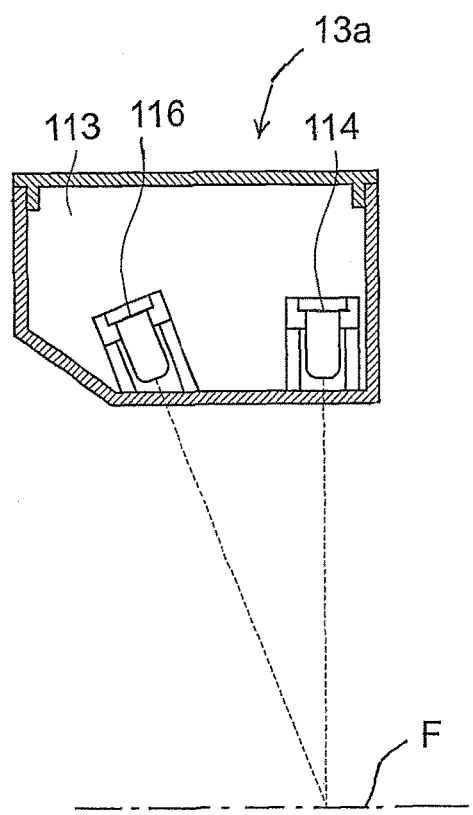
FIG. 6 is an enlarged view of main parts of the self-propelled electric vacuum cleaner shown in FIG. 1.

FIG. 6 is a sectional view showing a configuration of the floor detection sensor 13a. The floor detection sensor 13a includes a sensor module 113, and, in a translucent case of the sensor module 113, an infrared light emitting element (LED) 114 and a light receiving element (phototransistor) 116 are mounted.

An infrared beam emitted from the infrared light emitting element 114 is irradiated on an object (floor F), and the reflected light beam is received by a light receiving element 115. Meanwhile, when there is no object within a predetermined irradiation distance or when an infrared beam is absorbed by an object, a reflected light beam to be received goes below a predetermined value. Hence, whether or not there is a floor and whether or not there is an infrared beam-absorbing member is detected. The other floor detection sensors 13b to 13d also employ the same configuration.

(3) Configuration of Control System for Vacuum Cleaner

Figure 7:
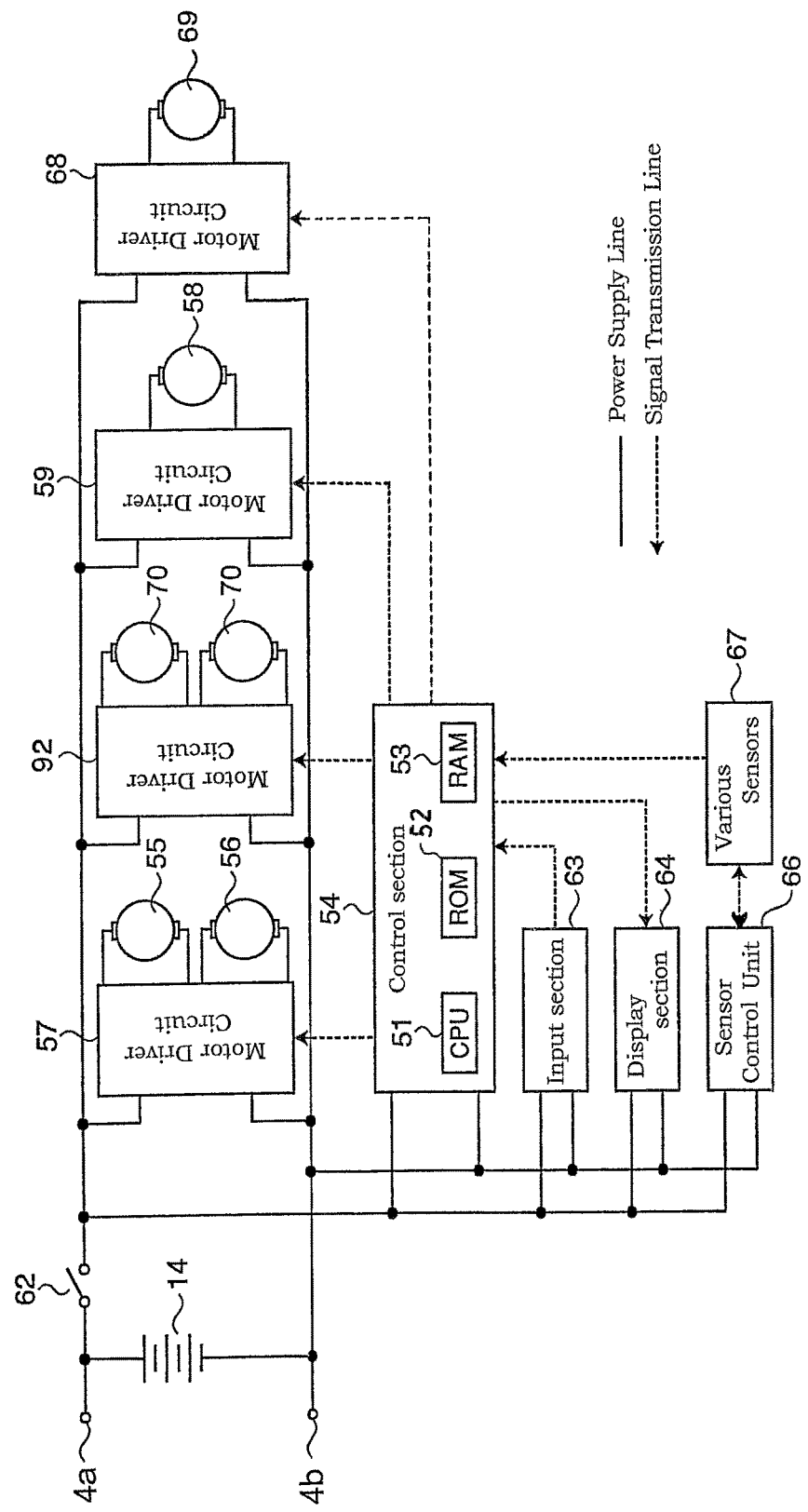
FIG. 7 is a block diagram showing a control system for the self-propelled electric vacuum cleaner shown in FIG. 1.

FIG. 7 is a block diagram showing the control system which controls the vacuum cleaner 1. As shown in FIG. 7, this control system includes a control section 54 which includes a microcomputer including a CPU 51, a ROM 52 and a RAM 53, a motor driver circuit 57 which controls driving wheel motors 55 and 56 which drive the two driving wheels 29, respectively, a motor driver circuit 59 which controls a brush driving motor 58 which drives the rotary brush 9, a motor driver circuit 92 which controls two driving wheel motors 70 which drive the two side brushes 10, respectively, a motor driver circuit 68 which controls a DC motor 69 mounted on the electric blower 22, a sensor control unit 66 which controls the power switch 62 and various sensors 67 to drive, the input section 63 and the display section 64. The various sensors 67 include the floor detection sensors 13a to 13d, the ultrasonic distance measuring sensor 112, the infrared beam detection main sensor 110 and the infrared beam detection sub sensors 111a to 111c. In addition, a permanent magnet excitation DC motor is used for the DC motor 69.

When the power switch 62 is turned on, output power of the battery 14 is supplied to the motor driver circuits 57, 92, 59 and 68, respectively, and is supplied to the control section 54, the input section 63, the display section 64 and the sensor control unit 66, respectively.

Further, the CPU 51 of the control section 54 is a central processing unit, and computes signals received from the input section 63 and the various sensors 67 based on a program stored in the ROM 52, and outputs the signals to the motor driver circuits 57, 92, 59 and 68 and the display section 64.

In addition, the RAM 53 temporarily stores various instructions inputted by the user from the input section 63, various operation conditions of the self-propelled electric vacuum cleaner 1 and outputs of the various sensors 65.

Further, the RAM 53 can store a travel map of the vacuum cleaner 1. The travel map is information related to travelling such as a travelling route or a travelling speed of the vacuum cleaner 1, and can be stored in the RAM 53 in advance by the user or can be automatically recorded during a cleaning operation of the vacuum cleaner 1.

Further, the control section 54 has a function of detecting a terminal voltage of the battery 14 and detecting a remaining battery capacity of the battery 14.

(4) Cleaning Operation of Vacuum Cleaner

When the user instructs a cleaning operation via the input section 63 to the vacuum cleaner 1 configured as described above, whether or not the dust collector 30 is attached is first checked, and, when the dust collector 30 is attached, the electric blower 22, the driving wheels 29, the rotary brush 9 and the side brush 10 are driven.

Thus, in a state where the rotary brush 9, the side brush 10, the driving wheels 29 and the rear wheel 26 are in contact with the floor F, the housing 2 suctions air including dust of the floor F through the suction port 6 while running in a predetermined range. In this case, the dust on the floor F is scooped up by rotation of the rotary brush 9 and is guided to the suction port 6. Further, dust at sides of the suction port 6 is guided to the suction port 6 by rotation of the side brush 10.

As indicated by an arrow A1 in FIG. 2, the air including dust suctioned into the housing 2 through the suction port 6 passes through the suction path 11 of the housing 2, and flows into the collected dust container 31 through the inflow path 34 of the dust collector 30. An airflow having flowed into the collected dust container 31 flows into a space between the filter 33 and the cover 32 through the filter 33, and is exhausted to the exhaust path 12 through the exhaust path 35. In this case, the dust included in the airflow in the collected dust container 31 is captured by the filter 33, and therefore the dust is deposited in the collected dust container 31.

The airflow having flowed from the dust collector 30 to the exhaust path 12 flows into the front storage room R1 as indicated by an arrow A2 in FIG. 2, and circulates in a first exhaust path and a second exhaust path which are not shown. Further, the airflow is exhausted as clean air whose dust has been removed by the filter 33 from the exhaust port 7 provided at a top surface of the housing 2 toward a rear and diagonally upper direction as indicated by an arrow A3 in FIG. 2.

Thus, the floor F is cleaned. In this case, air is exhausted in a rear and diagonally upper direction from the exhaust port 7, so that it is possible to prevent dust on the floor F from being blown up and improve cleanness in the room.

Further, as described above, the vacuum cleaner 1 moves forward when the left and right driving wheels 29 normally rotate in the same direction, moves backward when the left and right driving wheels 29 reversely rotate in the same direction, and turns about the center line C when the left and right driving wheels 29 rotate in opposite directions.

When, for example, the self-propelled electric vacuum cleaner 1 is about to reach a large step (cliff) or arrives at a circumference of a cleaning area, or when the self-propelled electric vacuum cleaner 1 collides against an obstacle on a route, the floor detection sensors 13a to 13d (FIG. 4) and the sensors which are not shown notify the control section 54 (FIG. 7) of this situation, the driving wheels 29 stop and the left and right driving wheels 29 rotate in the opposite directions to change a direction. Consequently, the vacuum cleaner 1 can clean an entire installation place or an entire desired range by running while avoiding a large step or an obstacle.

Figure 8:
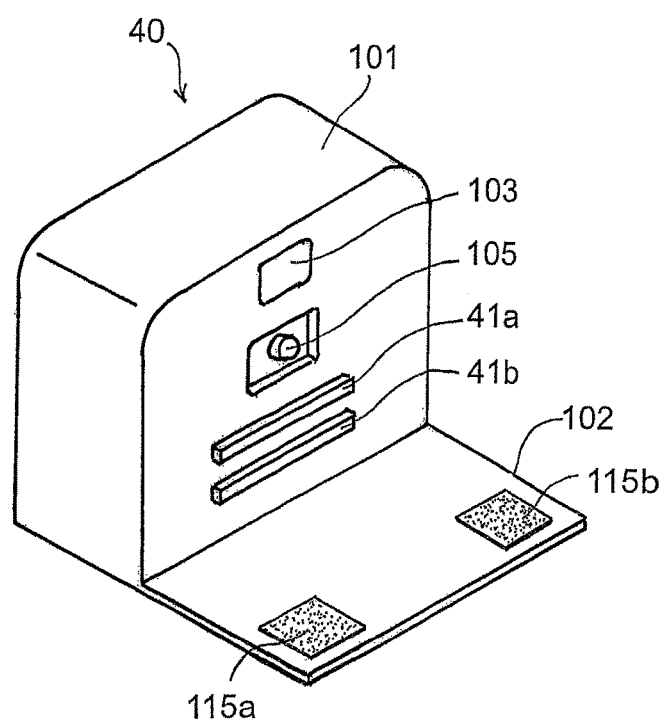
FIG. 8 is a perspective view of a charging unit according to Embodiment 1 of the present invention.

(5) Configurations of Charging Unit (Charging Station) and Control System for Charging Unit FIG. 8 is a perspective view of an external appearance of the charging unit according to Embodiment 1 of the present invention. As shown in FIG. 8, the charging unit 40 includes a main body 101, and a mounting plate 102 of the infrared beam-absorbing member elongated horizontally from a bottom surface of the main body 101.

At a front surface of the main body 101, the output terminals 41a and 41b which come into contact with the charging input terminals 4a and 4b (FIG. 1) to output charging power, an infrared beam-transmitting unit 103 which emits infrared beams to indicate for the vacuum cleaner 1 a return path, and an ultrasonic receiving section 105 which receives ultrasonic waves from the ultrasonic distance measuring sensor 112 (FIG. 3) are provided.

Further, on a top surface of the mounting plate 102, infrared beam-absorbing members 115a and 115b of nearly square sheet shapes are disposed. For the infrared beam-absorbing members 115a and 115b, commercial graphite sheets are used.

Figure 9:
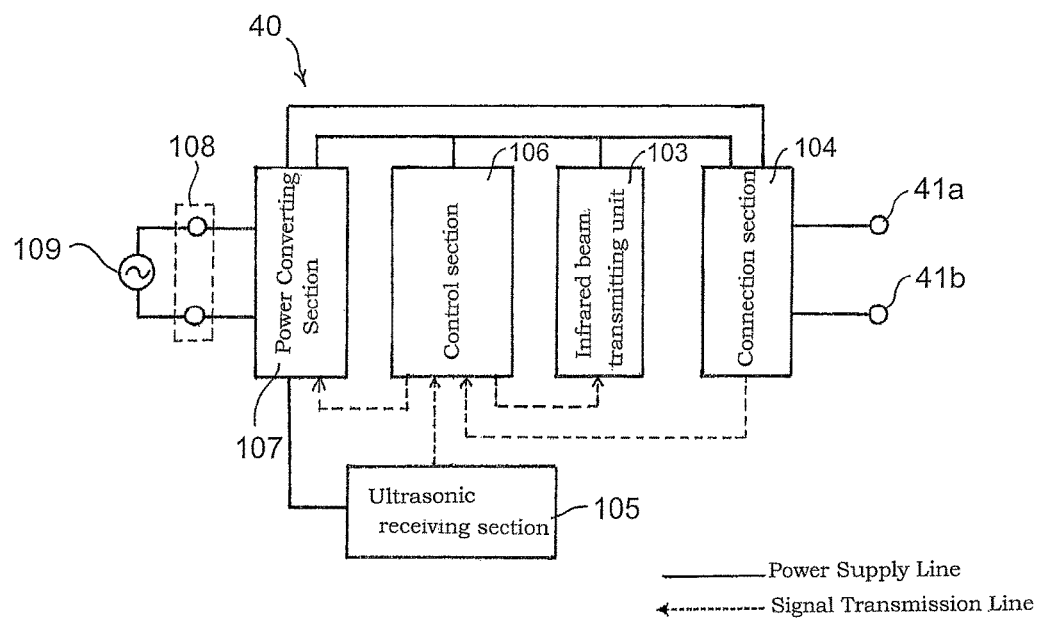
FIG. 9 is a block diagram showing the control system for the charging unit shown in FIG. 8.

FIG. 9 is a block diagram showing the control system which controls the charging unit 40. As shown in FIG. 9, this control system includes a control section 106, a power converting section 107, an infrared beam-transmitting unit 103, a connection section 104, an ultrasonic receiving section 105 and a power outlet 108.

The control section 106 includes a microcomputer including a CPU, a ROM and a RAM. The connection section 104 has a detection circuit which, when the charging input terminals 4a and 4b (FIGS. 1 and 2) contact the output terminals 41a and 41b, detects this contact and notifies the control section 106 of this contact.

The power converting section 107 converts commercial power (AC 100V and 50/60 Hz) inputted from a commercial power supply 109 via the outlet 108 into charging power (DC 24V) and control power (DC 5V) of the battery 14 (FIG. 7). The converted control power is supplied to the control section 106, the infrared beam-transmitting unit 103, the connection section 104 and the ultrasonic receiving section 105.

Further, when the charging input terminals 4a and 4b contact the output terminals 41a and 41b, the connection section 104 detects this contact operation and notifies the control section 106 of this contact operation, and then the power converting section 107 outputs charging power to the output terminals 41a and 41b via the connection section 104.

Furthermore, when the ultrasonic receiving section 105 detects an ultrasonic wave transmitted from the ultrasonic distance measuring sensor 112 (FIG. 3), the control section 106 converts infrared beams transmitted by the infrared beam-transmitting unit 103, from continuous light beams into pulsed intermittent light beams in response to outputs of the ultrasonic receiving section 105.

(6) Returning Operation of Vacuum Cleaner

Figure 10:
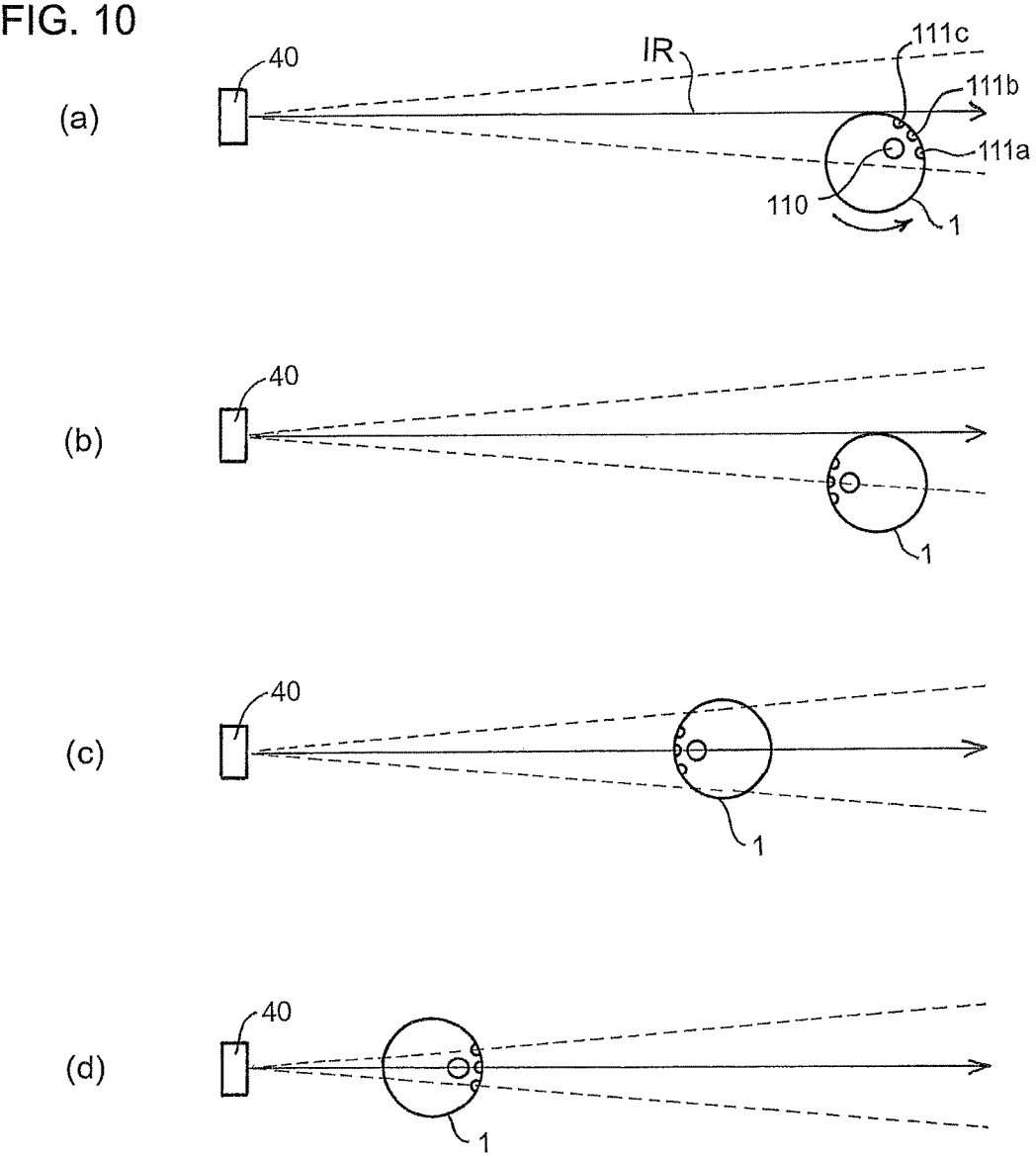
FIG. 10 is an explanatory view showing a returning operation according to Embodiment 1 of the present invention.

FIG. 10 is an explanatory view showing a returning operation of the vacuum cleaner 1 of returning to the charging unit 40.

In FIG. 10, the infrared beam-transmitting unit 103 (FIG. 8) in the charging unit 40 emits an infrared beam IR having a diffusion angle of 20° to 30° in an arrow direction to indicate for the vacuum cleaner 1 a return path.

Hence, when a cleaning operation is finished, or the remaining battery capacity of the battery 14 lowers to an allowance value and the control section 54 (FIG. 7) determines that the vacuum cleaner 1 needs to return to the charging unit 40, if the vacuum cleaner 1 exists in an irradiation area of the infrared beam IR as shown in FIG. 10(*a*), the infrared beam detection main sensor 110 detects the infrared beam IR and the vacuum cleaner 1 temporarily stops. Further, the vacuum cleaner 1 turns at this spot, detects a direction in which the charging unit 40 exists as indicated by FIG. 10(*b*) and changes a direction to this direction.

Then, as shown in FIG. 10(*c*), the three infrared beam detection sub sensors 111*a* to 111*c* can detect the infrared beam IR, and the vacuum cleaner 1 moves along the return path indicated by the infrared beam IR. Further, when the vacuum cleaner 1 approaches the charging unit 40 and an ultrasonic wave emitted from the ultrasonic distance measuring sensor 112 is received by the ultrasonic receiving section 105 (FIG. 8), the infrared beam IR is converted from a continuous light beam into an intermittent light beam (pulsed light beam).

When the infrared beam detection sub sensors 111*a* to 111*c* detect the intermittent light beams, the control section 54 checks that the vacuum cleaner 1 has accurately moved along the return path indicated by the infrared beam IR.

Further, when the ultrasonic distance measuring sensor 112 detects that the vacuum cleaner 1 has further moved forward and approached the charging unit 40 within a predetermined distance, the vacuum cleaner 1 temporarily stops, turns only 180° and directs the charging input terminals 4*a* and 4*b* (FIG. 1) to face the output terminals 41*a* and 41*b* of the charging unit 40 (FIG. 8).

Next, the vacuum cleaner 1 returns while moving backward toward the charging unit 40, and, when the vacuum cleaner yet turns 180°, the infrared beam detection sub sensors 111*a* to 111*c* are at positions at which the infrared beam IR cannot be received. Therefore, subsequent accurate movement of the vacuum cleaner to the charging unit 40 is not guaranteed.

Hence, in the present embodiment, as shown in FIG. 8, the infrared beam-absorbing members 115*a* and 115*b* are disposed on the mounting plate 102 of the charging unit 40 to accurately position the vacuum cleaner 1 with respect to the charging unit 40.

Figure 11:
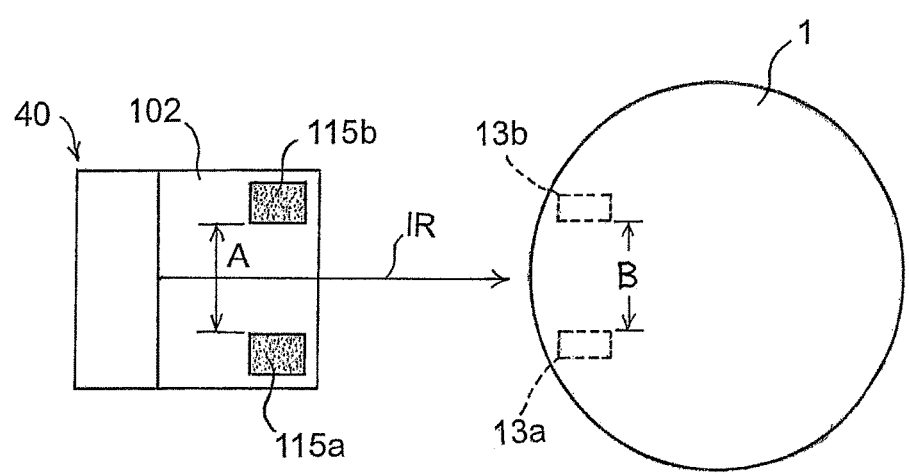
FIG. 11 is a top view showing the charging unit and the self-propelled electric vacuum cleaner according to Embodiment 1 of the present invention.

FIG. 11 is an enlarged top view showing a positional relationship between the charging unit 40 and the return path of the vacuum cleaner 1 in FIG. 10(*d*). The infrared beam-absorbing members 115*a* and 115*b* have an interval A symmetrically with respect to the return path indicated by a transmission direction of the infrared beam IR, and is disposed on the mounting plate 102 and along the floor F (FIG. 2).

In addition, the interval A between the infrared beam-absorbing members 115*a* and 115*b* corresponds to an interval B between the floor detection sensors 13*a* and 13*b* of the vacuum cleaner 1. Further, for the infrared beam-absorbing members 115*a* and 115*b*, graphite sheets are used.

Figure 12:
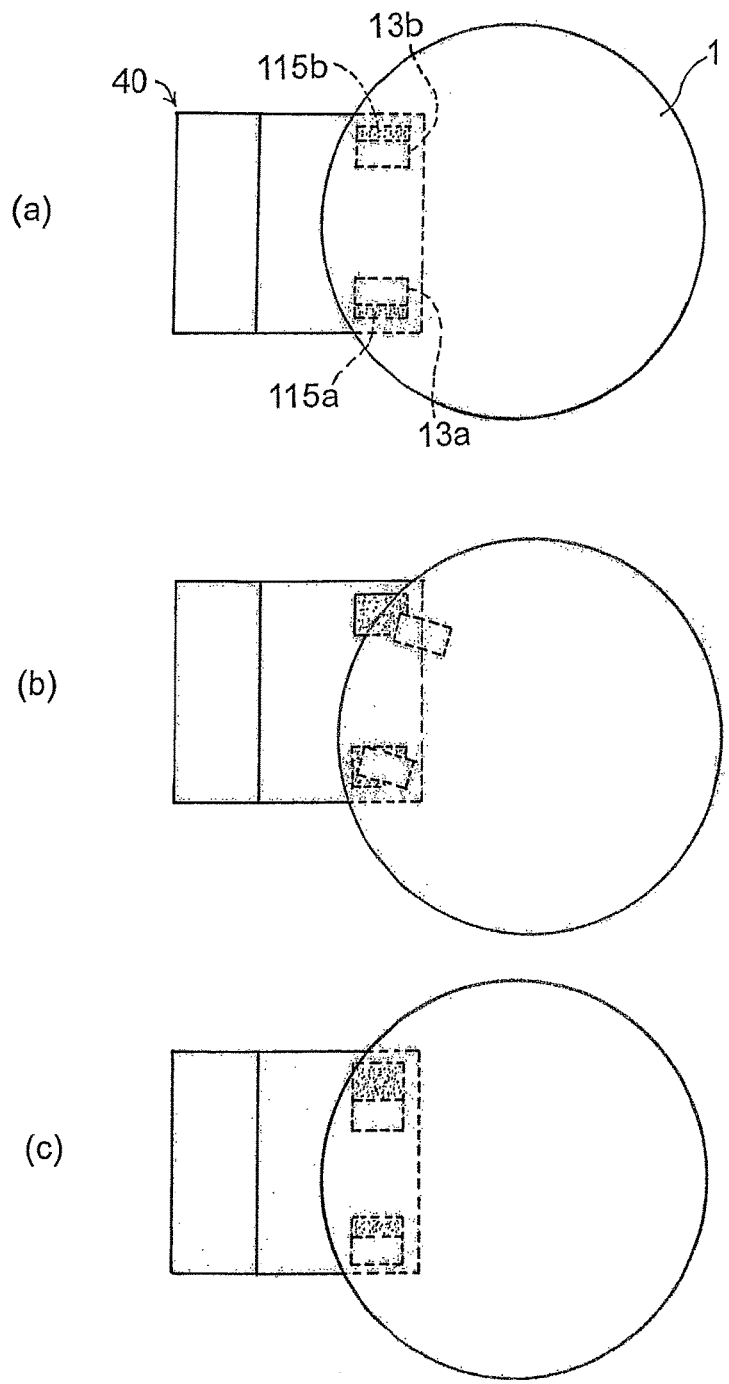
FIG. 12 is an explanatory view showing details of an operation according to Embodiment 1 of the present invention.

FIG. 12 shows a situation that the vacuum cleaner 1 has further approached the charging unit 40 from a position shown in FIG. 11. In a case shown in FIG. 12(*a*), the floor detection sensors 13*a* and 13*b* overlap the infrared beam-absorbing members 115*a* and 115*b*, and the floor detection sensors 13*a* and 13*b* simultaneously detect the infrared beam-absorbing members 115*a* and 115*b*.

Hence, the control section 54 determines that the vacuum cleaner 1 accurately moves along the return path indicated by the infrared beam IR, and causes the vacuum cleaner 1 to move backward. Further, when the charging input terminals 4*a* and 4*b* accurately contact the output terminals 41*a* and 41*b*, respectively, the output terminals 41*a* and 41*b* start charging the battery 14 via the charging input terminals 4*a* and 4*b*. The control section 54 stops a backward movement operation of the vacuum cleaner 1 at the same time when the charging is started, and continues a charging operation as is.

In a case shown in FIG. 12(*b*), while the infrared beam-absorbing member 115*a* is detected by the floor detection sensor 13*a*, the infrared beam-absorbing member 115*b* is detected by the floor detection sensor 13*b* with some delay from the detection by the floor detection sensor 13*a*. That is, there is a shift between both of these detection timings.

Hence, the control section 54 determines that the vacuum cleaner 1 has diagonally moved with respect to the return path indicated by the infrared beam IR. Hence, the control section 54 causes the vacuum cleaner 1 to move backward to the position in FIG. 11 once, calculates a detection timing shift (time difference) and corrects a travelling direction of the vacuum cleaner 1 as shown in FIG. 12(*a*).

In a case shown in FIG. 12(*c*), while the infrared beam-absorbing member 115*a* is detected by the floor detection sensor 13*a*, the infrared beam-absorbing member 115*b* is not detected at all by the floor detection sensor 13*b*.

Hence, the control section 54 determines that the vacuum cleaner 1 has moved while being displaced in parallel to the return path indicated by the infrared beam IR. Then, the control section 54 causes the vacuum cleaner 1 to move forward once, and corrects a travelling direction of the vacuum cleaner 1 as shown in FIG. 12(*a*).

Embodiment 2

Figure 13:
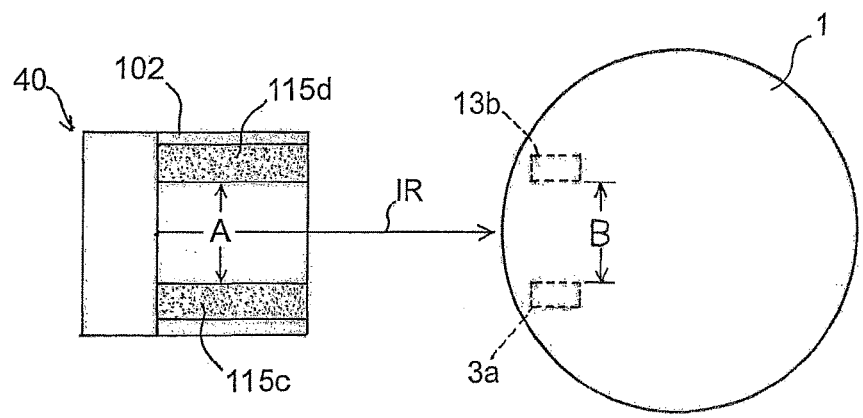
FIG. 13 is a view corresponding to FIG. 11 according to Embodiment 2 of the present invention.

FIG. 13 is a view corresponding to FIG. 11 according to Embodiment 2. That is, in the present embodiment, infrared beam-absorbing members 115*a* and 115*b* provided on a mounting plate 102 of a charging unit 40 in Embodiment 1 are replaced with infrared beam-absorbing members 115*c* and 115*d* of band shapes, and the other components are the same as those in Embodiment 1.

In this regard, the infrared beam-absorbing members 115*c* and 115*d* of the band shapes are disposed in parallel and at a predetermined interval symmetrically with respect to the return path indicated by an infrared beam IR, and on the mounting plate 102 and along a floor F (FIG. 2).

In addition, an interval A between the infrared beam-absorbing members 115*c* and 115*d* corresponds to an interval B between floor detection sensors 13*a* and 13*b* of a vacuum cleaner 1. Further, for the infrared beam-absorbing members 115*c* and 115*d*, too, graphite sheets are used.

Figure 14:
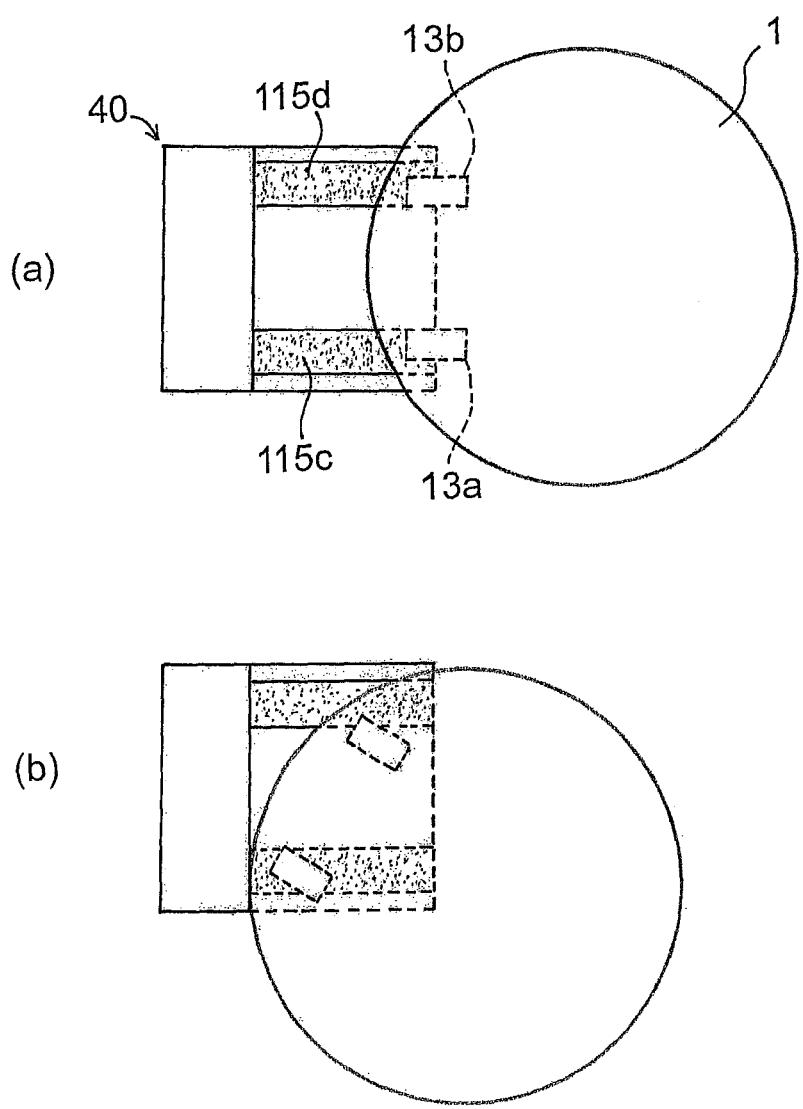
FIG. 14 is a view corresponding to FIG. 12 according to Embodiment 2 of the present invention.

FIG. 14 shows a situation that the vacuum cleaner 1 has further approached the charging unit 40 from a position shown in FIG. 13. In a case shown in FIG. 14(*a*), the floor detection sensors 13*a* and 13*b* overlap front ends of the infrared beam-absorbing members 115*c* and 115*d*, and the floor detection sensors 13a and 13b simultaneously detect the infrared beam-absorbing members 115c and 115d.

Hence, a control section 54 determines that the vacuum cleaner 1 has started accurately moving to the return path indicated by the infrared beam IR, and causes the vacuum cleaner 1 to further move. However, when at least one of the floor detection sensors 13a and 13b stops detecting the infrared beam-absorbing members 115c and 115d due to some cause as shown in FIG. 14(b), the control section 54 determines that abnormality has occurred in a route of the vacuum cleaner 1. Then, the control section 54 causes the self-propelled electric vacuum cleaner 1 to move forward to a position in FIG. 13 once, and corrects a travelling direction of the vacuum cleaner 1 as shown in FIG. 14(a).

Embodiment 3

Figure 15:
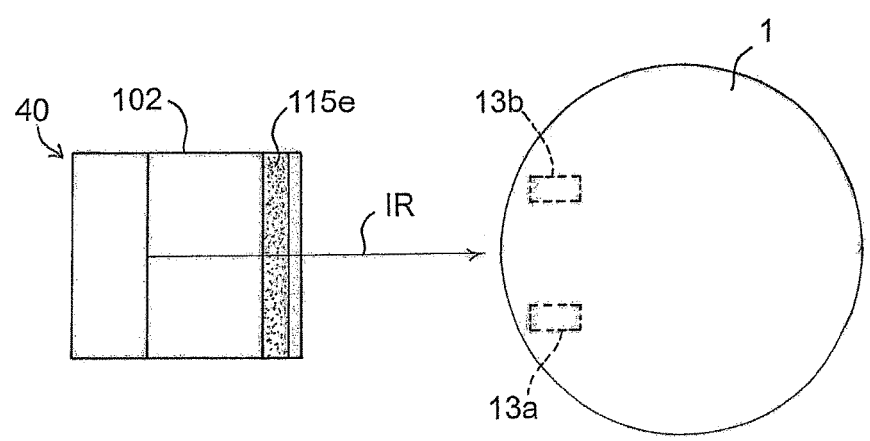
FIG. 15 is a view corresponding to FIG. 11 according to Embodiment 3 of the present invention.

FIG. 15 is a view corresponding to FIG. 11 according to Embodiment 3. That is, in the present embodiment, infrared beam-absorbing members 115a and 115b provided on a mounting plate 102 of a charging unit 40 in Embodiment 1 are replaced with an infrared beam-absorbing member 115e of one band shape, and the other components are the same as those in Embodiment 1.

In this regard, the infrared beam-absorbing member 115e of the band shape is disposed orthogonal to a return path indicated by an infrared beam IR, and on the mounting plate 102 and along a floor F (FIG. 2). Further, for the infrared beam-absorbing member 115e, too, a graphite sheet is used.

Figure 16:
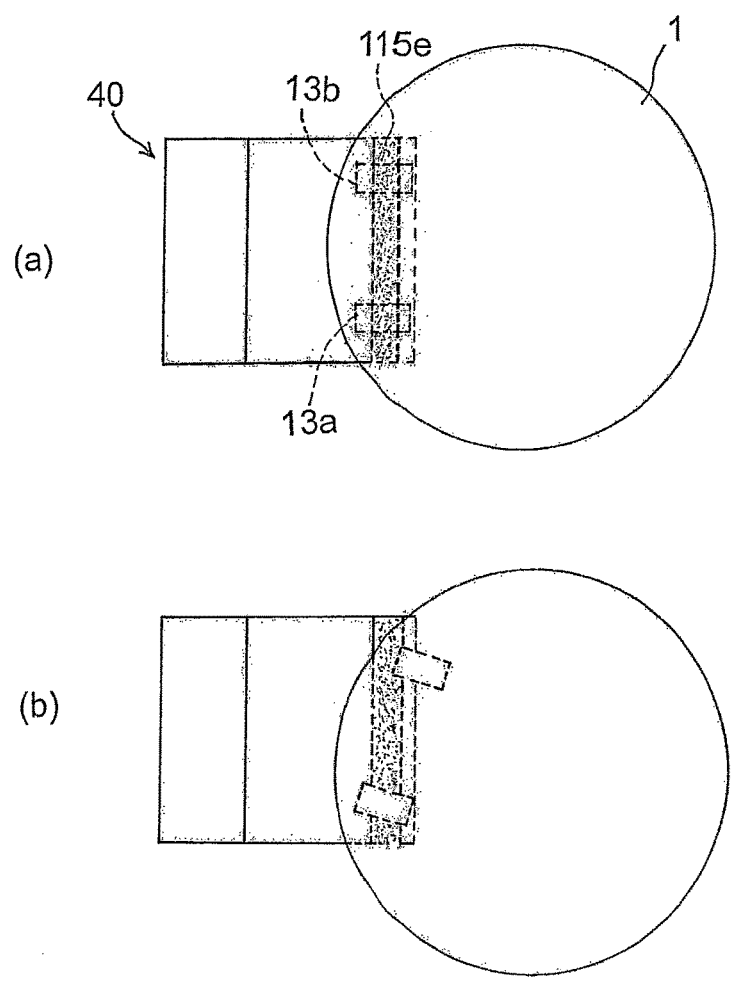
FIG. 16 is a view corresponding to FIG. 12 according to Embodiment 3 of the present invention.

FIG. 16 shows a situation that the vacuum cleaner 1 has further approached the charging unit 40 from a position shown in FIG. 15. In a case shown in FIG. 16(a), the infrared beam-absorbing member 115e is simultaneously detected by floor detection sensors 13a and 13b.

Hence, a control section 54 determines that a self-propelled electric vacuum cleaner 1 accurately moves along the return path indicated by the infrared beam IR, and causes the vacuum cleaner 1 to further move. In a case shown in FIG. 16(b), there is a shift between a timing at which the floor detection sensor 13a detects the infrared beam-absorbing member 115e and a timing at which the floor detection sensor 13b detects the infrared beam-absorbing member 115e.

Hence, the control section 54 determines that the vacuum cleaner 1 diagonally moves to the return path indicated by the infrared beam IR. Hence, the control section 54 causes the vacuum cleaner 1 to move backward to a position in FIG. 15 once, calculates a timing shift (time difference) and corrects a travelling direction of the vacuum cleaner 1 as shown in FIG. 16(a).

Embodiment 4

Figure 17:
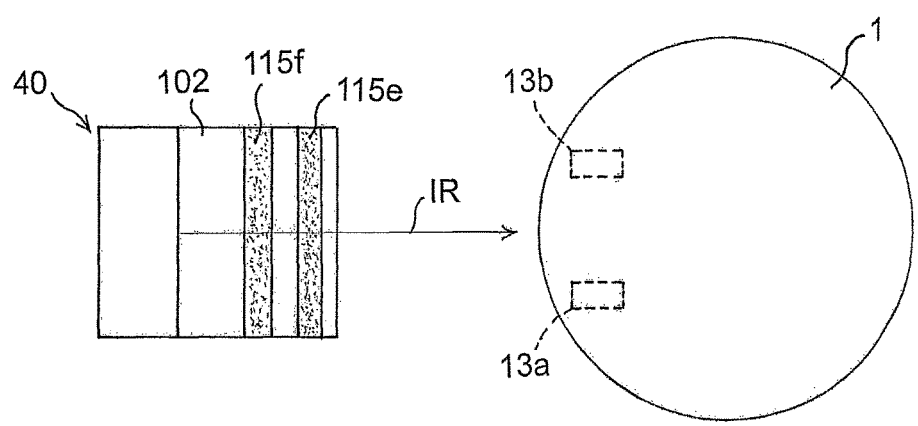
FIG. 17 is a view corresponding to FIG. 11 according to Embodiment 4 of the present invention.

FIG. 17 is a view corresponding to FIG. 15 according to Embodiment 4. That is, in the present embodiment, an infrared beam-absorbing member (graphite sheet) 115f of a band shape is added in parallel to and at a predetermined interval from an infrared beam-absorbing member 115e of a band shape provided on a mounting plate 102 of a charging unit 40 in Embodiment 3, and the other components are the same as those in Embodiment 3.

Figure 18:
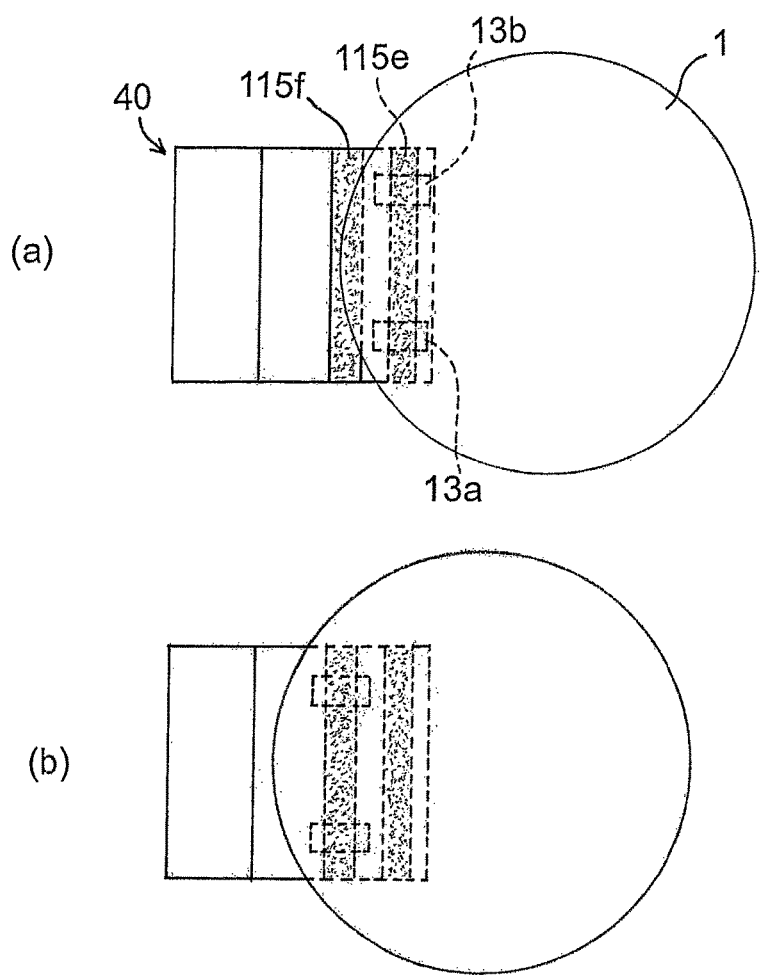
FIG. 18 is a view corresponding to FIG. 12 according to Embodiment 4 of the present invention.

FIG. 18 shows a situation that a vacuum cleaner 1 has further approached the charging unit 40 from a position shown in FIG. 17. In a case shown in FIG. 18(a), the first infrared beam-absorbing member 115e is simultaneously detected by floor detection sensors 13a and 13b.

Hence, a control section 54 determines that the vacuum cleaner 1 accurately moves along the return path indicated by an infrared beam IR, and causes the vacuum cleaner 1 to further move backward. In a case shown in FIG. 18(b), further, the second infrared beam-absorbing member 115f is simultaneously detected by floor detection sensors 13a and 13b. Hence, the control section 54 determines that the vacuum cleaner 1 accurately moves along the return path indicated by the infrared beam IR, and causes the vacuum cleaner 1 to further move backward.

In addition, in FIG. 18(a) or (b), when there is a shift between detection timings at which the floor detection sensors 13a and 13b detect the infrared beam-absorbing member 115e or 115f, the control section 54 causes the vacuum cleaner 1 to move backward to a position in FIG. 17, and corrects a travelling direction of the vacuum cleaner 1 as shown in FIG. 18(a) or 18(b).

Thus, in each embodiment, too, the vacuum cleaner 1 can be guided by an infrared beam-absorbing member and can efficiently and accurately return to the charging unit 40.

DESCRIPTION OF REFERENCE SIGNS

1: SELF-PROPELLED ELECTRIC VACUUM CLEANER
2: HOUSING
4a: CHARGING INPUT TERMINAL
4b: CHARGING INPUT TERMINAL
13a TO 13d: FLOOR DETECTION SENSOR
14: BATTERY
40: CHARGING UNIT
41a: OUTPUT TERMINAL
41b: OUTPUT TERMINAL
62: POWER SWITCH
63: INPUT SECTION
101: MAIN BODY
102: MOUNTING PLATE
103: INFRARED BEAM-TRANSMITTING UNIT
104: CONNECTION SECTION
105: ULTRASONIC RECEIVING SECTION
106: CONTROL SECTION
107: POWER CONVERTING SECTION
108: OUTLET
110: INFRARED BEAM DETECTION MAIN SENSOR
111a TO 111c: INFRARED BEAM DETECTION SUB SENSOR
112: ULTRASONIC DISTANCE MEASURING SENSOR
113: SENSOR MODULE
114: INFRARED LIGHT EMITTING ELEMENT
115a TO 115f: INFRARED BEAM-ABSORBING MEMBER
116: LIGHT RECEIVING ELEMENT
F: FLOOR
IR: INFRARED BEAM

What is claimed is:

1. A charger that charges a battery of a self-propelled electric vacuum cleaner which runs on a floor based on outputs of an infrared beam reflection floor detection sensor and an infrared beam detection sensor, the charger comprising:
infrared beam-transmitting circuitry that emits an infrared beam to indicate a return path, and
an infrared beam absorber, wherein
the floor detection sensor detects a presence of the infrared beam absorber, the infrared beam-transmitting circuitry and the infrared beam absorber are provided such that the infrared beam detected by the infrared beam detection sensor and the infrared beam absorber detected by the floor detection sensor guide the vacuum cleaner to return to the charger, the floor detection sensor detects whether the floor is present by irradiating the floor with an infrared light from an infrared light emitter and receiving reflected infrared light from the infrared light emitter that is reflected by the floor.

2. The charger of claim 1, wherein the infrared beam absorber includes a plurality of infrared beam-absorbing members disposed near the return path and along the floor.

3. The charger of claim 1, wherein the infrared beam absorber includes a plurality of band-shaped infrared beam-absorbing members disposed in parallel to the return path and along the floor.

4. The charger of claim 1, wherein the infrared absorber includes a band-shaped infrared beam-absorbing member disposed orthogonal to the return path and along the floor.

5. A charging system for a self-propelled electric vacuum cleaner, comprising:

a self-propelled electric vacuum cleaner including an infrared beam reflection floor detection sensor, and a charger including an infrared beam absorber, wherein when the self-propelled electric vacuum cleaner is to be charged and returns to the charger, the floor detection sensor detects the infrared beam absorber, and the floor detection sensor detects whether the floor is present by irradiating the floor with an infrared light from an infrared light emitter and receiving reflected infrared light from the infrared light emitter that is reflected by the floor, and infrared beam-transmitting circuitry and the infrared beam absorber are provided such that an infrared beam detected by an infrared beam detection sensor and the infrared beam absorber detected by the floor detection sensor guide the vacuum cleaner to return to the charger.

* * * * *